United States Patent [19]
Franklin et al.

[11] Patent Number: 5,892,158
[45] Date of Patent: Apr. 6, 1999

[54] METHOD FOR INSTALLING A FLOW METER SYSTEM AND FLOW METER APPARATUS THEREFOR

[75] Inventors: Mark Terrance Franklin, San Diego; John Elwood McGregor, III, Encinitas, both of Calif.

[73] Assignee: WaterSavers, Inc., San Diego, Calif.

[21] Appl. No.: 751,334

[22] Filed: Nov. 18, 1996

Related U.S. Application Data

[63] Continuation-in-part of Ser. No. 633,537, Apr. 17, 1996, Pat. No. 5,764,158, which is a continuation-in-part of Ser. No. 560,161, Nov. 20, 1995, abandoned.

[51] Int. Cl.[6] .................................................. G01F 1/06
[52] U.S. Cl. ..................................... 73/861.77; 73/861.79
[58] Field of Search ........................... 73/861.77, 861.78, 73/861.79, 861.74, 195; 529/34, 220.1, 220.8; 137/15, 315, 360

[56] References Cited

U.S. PATENT DOCUMENTS

| 3,136,570 | 6/1964 | Lee | 137/360 |
|---|---|---|---|
| 3,576,197 | 4/1971 | Bastian | 137/360 |
| 3,884,258 | 5/1975 | Mull | 137/360 |
| 4,706,702 | 11/1987 | Grasseschi | 137/360 |
| 4,860,503 | 8/1989 | Palmer | 52/220.1 |
| 5,199,307 | 4/1993 | Onoda et al. | |

*Primary Examiner*—Harshad Patel
*Attorney, Agent, or Firm*—Higgs, Fletcher & Mack LLP; Bernard L. Kleinke

[57] ABSTRACT

The method includes using a flow meter system having a meter assembly and a transmitter device in conjunction with a utility distribution system disposed behind a wall in a space and having a conduit extending through a conduit opening in the wall for coupling a fixture thereto. The meter assembly is connected in fluid communication with the conduit, and positioned outside of the space and in front of the wall. The transmitter device is installed within the space and positioned remotely from the meter assembly. The transmitter device is connected electrically to the transmitter device, and the fixture is coupled in fluid communication with the meter assembly, thereby concealing the meter assembly and the conduit opening.

15 Claims, 2 Drawing Sheets

METHOD FOR INSTALLING A FLOW METER SYSTEM AND FLOW METER APPARATUS THEREFOR

CROSS-REFERENCE TO RELATED APPLICATIONS

This patent application is a continuation-in-part patent application of U.S. patent application Ser. No. 08/633,537, filed Apr. 17, 1996, now U.S. Pat. No. 5,764,158 and entitled "METER READING DATA TRANSMISSION SYSTEM AND METHOD OF USING SAME," which is a continuation-in-part patent application of U.S. patent application Ser. No. 08/560,161, filed Nov. 20, 1995, now abandoned and entitled "FLOW METER AND METHOD OF USING SAME."

TECHNICAL FIELD

The present invention relates in general to an improved method for installing a flow meter system and a flow meter apparatus therefor. The invention more particularly relates to a method of installing a flow meter system onto a utility distribution system for monitoring the use of a utility resource from a remote location, and which installation can be accomplished utilizing a novel flow meter apparatus.

BACKGROUND ART

The use of flow metering devices is well known for measuring the quantity of a particular utility resource which is supplied by a utility provider. For example, measuring the quantity of natural gas, electricity and water supplied by the local gas, power and water utility providers to a user of those utility resources has been utilized to determine the payment required for the utility resources actually used by the user. Primarily, such measurements have been accomplished at a service connection point for a building or other structure for each utility resource, without regard to the usage of the utility resources by individual utility resource users within each building.

A flow meter system was disclosed in prior filed and commonly owned U.S. patent application Ser. No. 08/560,161, which is incorporated by reference as if fully set forth herein, for sub-metering the use of utility resources utilized by many individual utility resource users within a single building. The sub-metering flow meter system disclosed therein is especially suitable for enabling the specific usage of a utility resource by an individual user to be monitored. For example, the sub-metering flow meter system is particularly adapted to measuring water usage in a typical one bedroom, one bath, residence apartment or condominium within a multi-family residence having seven separate water pipes for delivering water, including: (1) a kitchen sink hot water supply pipe; (2) a kitchen sink cold water supply pipe; (3) a bathroom sink hot water supply pipe; (4) a bathroom sink cold water supply pipe; (5) a toilet cold water supply pipe; (6) a shower hot water supply pipe; and (7) a shower cold water supply pipe.

Prior filed and co-owned U.S. patent application Ser. No. 08/633,537, which is also incorporated by reference as if fully set forth herein, disclosed a wireless transmission system which could be utilized with a sub-metering flow meter system to facilitate the remote monitoring of the many water supply pipes associated with each tenant of a building.

As a result, a sub-metering flow meter system could now be utilized within each tenant occupied space to monitor the specific usage of water therein from a remote location. Each flow meter comprising the flow meter system could be coupled to each water supply pipe, and the information obtained by the meters concerning the amount of water used could be transmitted by a wireless transmission system.

However, the installation of such a sub-metering flow meter system with the wireless transmission system required that portions of the systems be exposed within the tenant occupied space in some instances, especially the flow meters for exposed water supply pipes. The resulting effect on the aesthetic appearance of the space was, in some applications, somewhat less than desirable, though, due to the presence of the flow meters.

Alternatively, openings in the wall near the exposed water supply pipes would receive and hide the flow meters associated with the exposed pipes. Unfortunately, in some applications, such a procedure would be time consuming, expensive, and would not be entirely aesthetically pleasing in appearance.

Therefore, it would be highly desirable to have a new and improved method for installing a flow meter system, and which method can be accomplished with a novel flow meter apparatus. Such a method should enable the flow meter system to be installed onto a utility distribution system quickly and easily, and should substantially conceal all evidence that the flow meter has been installed.

DISCLOSURE OF INVENTION

Therefore, the principal object of the present invention is to provide a new and improved method for installing a flow meter system, and a flow meter apparatus therefor, wherein the flow meter system is installed in quick and easy manner, and which hides all evidence indicating that the flow meter system has been installed.

Briefly, the above and further objects of the present invention are realized by providing a new and improved method of installing a flow meter system which can be accomplished quickly and easily, and in a concealing manner, with a novel flow meter apparatus.

The method includes using a flow meter system having a meter assembly and a transmitter device in conjunction with a utility distribution system disposed behind a wall in a space and having a conduit extending through a conduit opening in the wall for coupling a fixture thereto. The meter assembly is connected in fluid communication with the conduit, and positioned outside of the space and in front of the wall. The transmitter device is installed within the space and positioned remotely from the meter assembly. The transmitter device is connected electrically to the transmitter device, and the fixture is coupled in fluid communication with the meter assembly, thereby concealing the meter assembly and the conduit opening.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
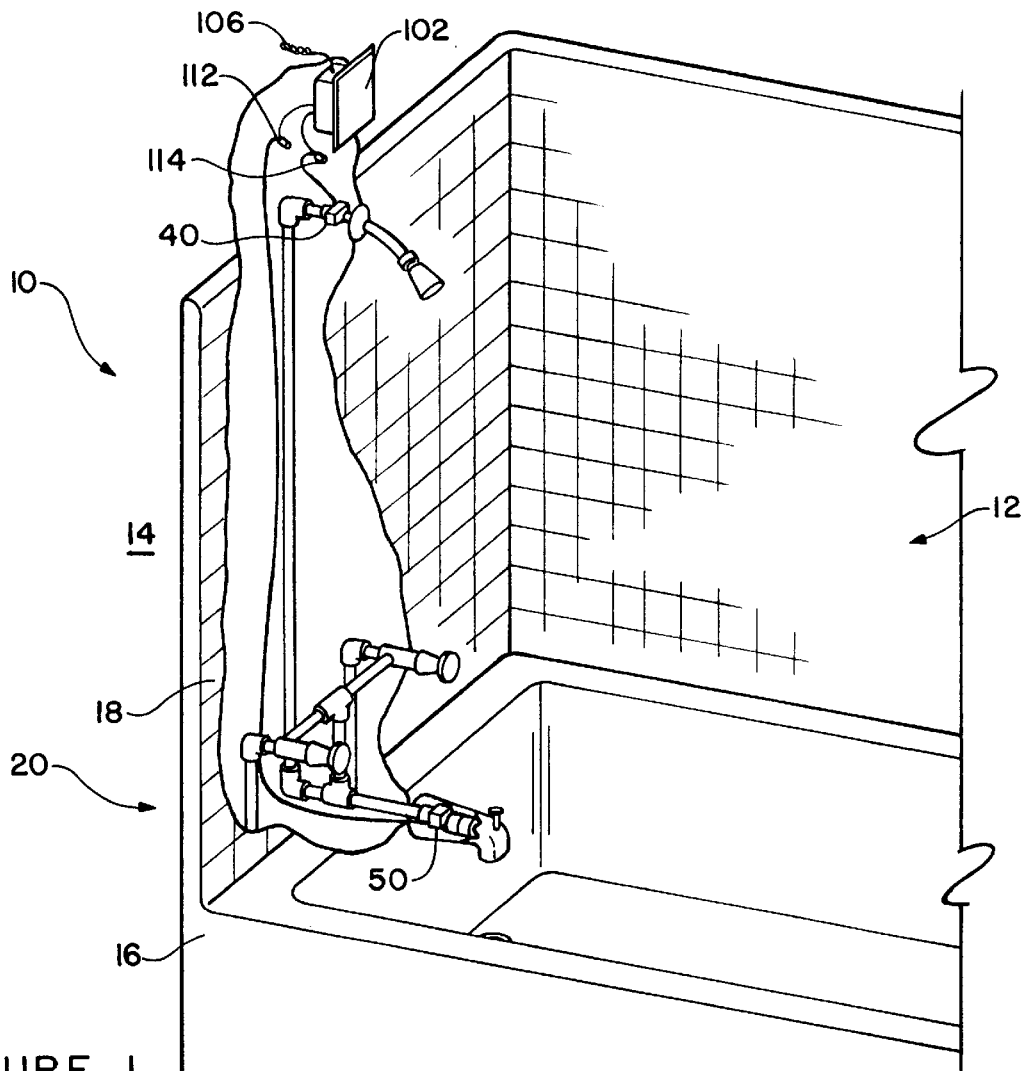
FIG. 1 is a partially cut-away perspective view of a flow meter system which is installed on a utility distribution system in accordance with the present invention.

Referring now to the drawings, and more particularly to FIG. 1 thereof, there is shown a flow meter system 10, which may be installed on a water supply system 20 in accordance with the present invention. As illustrated in FIG. 1, the water supply system 20 is disposed substantially in a space behind a wall 14 of a shower/bathtub enclosure 12 having a bathtub 16 and a tile surface 18, or other surface such as fiberglass (not shown), extending upwardly from the bathtub 16 along the wall 14. Although the water supply system 20 is illustrated in connection with the shower/bathtub enclosure 12, it will be understood by one skilled in the art that the flow meter system 10 could also be installed on other water supply systems. Furthermore, the flow meter system 10 may also be adapted for installation on other utility resource distribution systems, such as a natural gas supply system.

To facilitate the supply of water to the shower/bathtub enclosure, the water supply system 20 includes an elbow 21 coupled to a shower pipe 22 and a faucet conduit 24 as shown in FIGS. 1–4. The conduit 24 is coupled to the shower pipe 22 disposed in the space behind the wall 14, and extends outwardly from the space and through the wall 14 into the shower/bathtub enclosure 12 to receive a faucet fixture or tub spout 54 thereon. The elbow 21 is adapted to receive a shower head fixture 43 therein.

Figures 2, 3, 4:
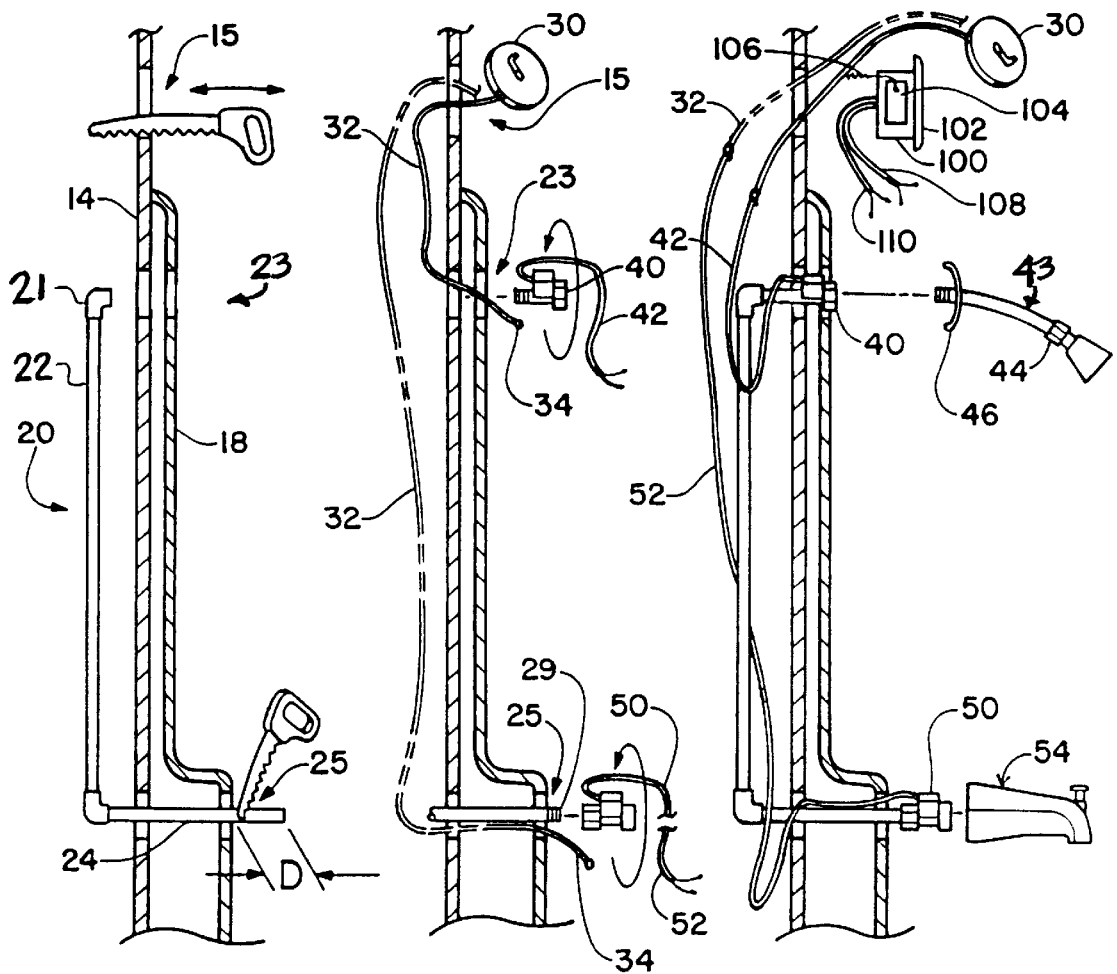
FIGS. 2–4 are cross-sectional elevational views illustrating the installation of the flow meter system onto the utility distribution system of FIG. 1.

As shown in FIGS. 2–4, the elbow 21 is positioned adjacent to an opening 23 to receive the showerhead fixture 43. The conduit 24 extends outwardly from the space, through the wall 14 and outwardly through the bathtub 16 via an opening 25 to receive the fixture 54.

To facilitate the monitoring of the water supplied by the water supply system 20, the flow meter system 10 includes a shower meter assembly 40 having an electrical conductor 42 connected thereto, and a faucet meter assembly 50 having an electrical conductor 52 connected thereto. The electrical conductors 42 and 52 each contain wire conductors to provide an electrical circuit to the meter assemblies 40 and 50, and to transmit an electrical information signal indicative of the flow of water and generated by the meter assemblies 40 and 50 for remote monitoring purposes.

A transmitter apparatus 104 having a pair of electrical conductors 108 and 110 and an antenna 106 is adapted to be coupled to the meter assemblies 40 and 50 for receiving the electrical information signal, for supplying electrical energy to the meter assemblies 40 and 50, and for relaying the signals to a remote location (not shown). A transmission system including a transmitter apparatus is described in co-pending U.S. patent application Ser. No. 08/633,537, which is incorporated by reference as if fully set forth herein. It will be understood by one skilled in the art that two or more of such transmitters may be hard wired together to facilitate the transmission of flow information signals generated by the meter assemblies 40 and 50.

As shown in FIGS. 2–4, the water supply system 20 may require slight modification to receive the flow meter system 10. In particular, the length of conduit 24 may require adjustment to receive the flow meter assembly 50, in a concealed manner. Such an adjustment of the conduit length may be required when the water supply system 20 is adapted for receiving standard fixtures. However, it will be understood by one skilled in the art that the existing conduit 24 may be adapted to receive the flow meter system 10, and thus, the conduit 24 would not require adjustment.

Considering now the installation of the flow meter system 10, the conduit 24 is adjusted to receive the fixture 54, and to conceal the flow meter system 10. The adjustment of the conduit 24 may be accomplished with a saw or other similar cutting device suitable for the purpose.

The amount of conduit which must be removed to receive the meter assembly 50 is dependent upon the axial length of the meter assembly 50, as well as the fixture to be attached thereto, such as the faucet fixture 54. As shown in FIG. 2, the length of conduit 24 is adapted to receive a standard faucet fixture (not shown), wherein the standard faucet fixture engages the bathtub 16 to conceal the opening 25. As will be described hereinafter in greater detail, the inventive faucet fixture 54 is especially adapted for use in installation of the flow meter system 10. However, the faucet fixture 54 does not require conduit 24 to extend outwardly as far as a standard faucet fixture requires the conduit 24 to extend. Thus, a length D of conduit 24 must be removed to enable the faucet fixture 54 to conceal the meter assembly 50.

An opening 15 in the wall 14 above the tile 18 is made using a saw or other appropriate instrument. The opening 15 is adapted to receive a housing 100 having an associated cover plate 102, wherein the housing 100 and the cover plate 102 enable the transmitter 104 to be concealed within the housing 100 when installed. In some applications (not shown), the tile 18 may extend upwardly to cover all of wall 14. In such situations, it may be desirable to create an opening (not shown) in another wall (not shown) that is not covered by tile to avoid possibly damaging the tile 18, wherein the other opening would be created instead of opening 15.

Upon adjusting the length of the conduit 24, a nipple or coupling device 29 is affixed to the conduit 24 to facilitate the coupling of the meter assembly 50 thereto. The coupling device 29 may be secured to the conduit 24 in a water tight manner by any acceptable method known in the art. Depending upon the meter assembly construction, the coupling device 29 may have either a male or female threaded portion to engage the respective fixture. For example, as shown in FIG. 3, coupler device 29 has a male threaded portion for cooperating with meter assembly 50.

Using a wire pulling device 30, such as fish tape or other similar device, including an extendable member 32 having a distal end 34, the distal end 34 is extended inwardly through the opening 15 and into the space behind the wall 14. To facilitate the installation of meter assembly 40, the distal end 34 is further extended outwardly through the opening 23 to engage the electrical conductor 42.

As illustrated in FIGS. 3–4, the meter assembly 40 is then coupled threadably to the elbow 21 to connect the meter assembly 40 in fluid communication with the pipe 22. The elbow 21 and the pipe 22 are not shown in FIG. 3 for illustration purposes only. In this regard, the meter assembly 40 is manually brought into engagement with the elbow 21 and subsequently rotated to threadably engage the meter assembly 40.

A water tight sealing compound or tape may be disposed between the elbow 21 and the meter assembly 40. When secured, the meter assembly 40 is positioned substantially within the opening 23. Furthermore, the meter assembly 40 is positioned remotely from the transmitter 104.

Once the meter assembly 40 is secured to the elbow 21, the electrical conductor 42 is engaged by the distal end 34, and brought into the space behind the wall 14 via the opening 23 where it will be concealed (FIG. 4).

Similarly, the extendable member 32 may be extended through the opening 15, into the space behind the wall 14, and extended through the opening 25 to engage the electrical conductor 52. To couple the meter assembly 50 to the coupling device 29, the meter assembly 50 is rotated to threadably engage the coupling device 29 to secure the meter assembly 50 to the conduit 24. The water tight sealing compound or tape may also be used between the meter assembly 50 and the coupling device 29. Subsequently, the electrical conductor 52 may be engaged by the distal end 34 and drawn through the opening 25 and into the opening behind the wall 14 to conceal the electrical conductor 52 (FIG. 4).

The electrical conductors 42 and 52 may be left free to spin around with the meter assemblies 40 and 50, respectively, as they are threadably engaged with the elbow 21 and the coupling device 29, respectively. In this way, the electrical conductors 42 and 52 do not become twisted about the respective conduits 22 and 24.

Alternatively, the electrical conductors 42 and 52 may be wrapped initially around the respective meter assemblies 40 and 50. For example, the meter assemblies 40 and 50 are rotated clockwise to threadably engage the elbow 21 and the coupling device 29. By initially wrapping the electrical connectors 42 and 52 about the respective meter assemblies 40 and 50 also in a clockwise manner, the electrical conductors 42 and 52 can be unwrapped from the respective meter assemblies 40 and 50 as the meter assemblies 40 and 50 are rotated in a clockwise direction. In this way, the meter assemblies 40 and 50 are coupled to the elbow 21 and the coupling device 29 without the electrical conductors 42 and 52 becoming entangled.

The shower head fixture 43 is threadably engaged with the meter assembly 40, and in fluid communication therewith, to facilitate the distribution of water therefrom. The escutcheon plate 46 is then positioned to substantially conceal the meter assembly 40 and the opening 23. Similarly, the meter assembly 50 is received within the faucet fixture 54, and coupled therewith, to facilitate the distribution of water therefrom, whereby the faucet fixture 54 conceals the meter assembly 50 and the opening 25.

Preferably, the electrical conductors 42 and 52 are long enough to be drawn out of the opening 15 to facilitate their connection to the conductors 108 and 110. The connection of the electrical conductors 42 and 52 to the conductors 108 and 110 may be accomplished with standard connection devices. However, the use of a tamper proof connecting technique, such as soldering, or other comparable procedure, is preferred to prevent the connection from being tampered with.

The connected conductors 42, 52, 108 and 110 are inserted through the opening 15 and concealed within the space behind the wall 14. The housing 100 containing the transmitter 104 is then inserted into the opening 15, and secured within the opening 15. The cover plate 102 is secured to the housing 100 to conceal the transmitter 104, the housing 100 and the opening 15.

Figure 5:
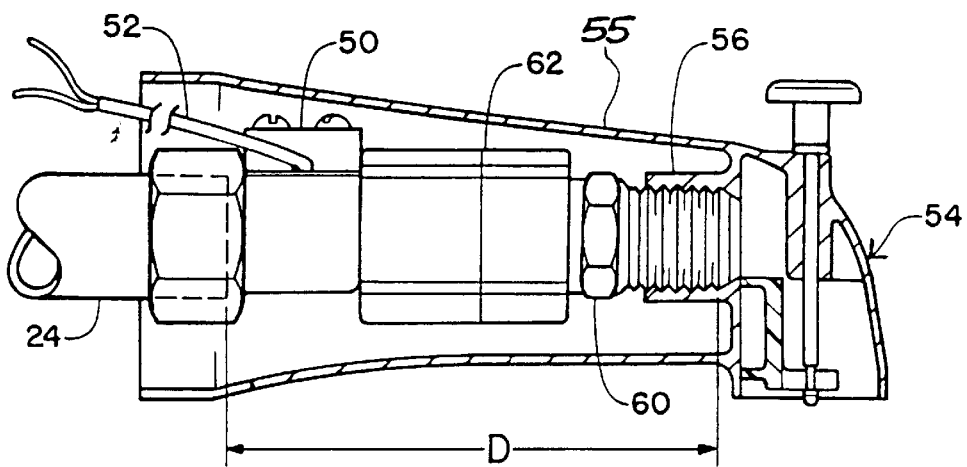
FIG. 5 is cross-sectional elevational view of a flow meter apparatus which may be used in accordance with the method of the present invention.

Considering now the faucet fixture 54 with reference to FIG. 5, the faucet fixture 54 is adapted to be quickly and easily installed onto a water supply system, such as the water supply system 20. The faucet fixture 54 includes a housing 55 defines a hollow interior through which the supplied water flows. A threaded internal female coupler 56 disposed within the hollow interior facilitates the coupling of the fixture 54 to the conduit 24. Coupled threadably to the internal coupler 56, and in fluid communication therewith, are spacer members 60 and 62. The meter assembly 50 is adapted to be threadably coupled to the spacer member 62 within the hollow interior.

The spacer members 60 and 62 enable the meter assembly 50 to be secured within the hollow interior at an expanded portion of the housing 55. The expanded portion of the housing 55 is sufficiently large enough to receive the meter assembly 50 completely therein. In this way, the meter assembly 50 and the spacer members 60 and 62 may be coupled to the faucet fixture 54, and concealed therein, for defining a unitary component.

As described previously, the conduit 24 requires modification to receive the faucet fixture 54. In this regard, the conduit 24 is generally sized to be coupled to an internal coupler, such as internal coupler 56. Thus, to accommodate the spacer members 60 and 62, as well as the meter assembly 50, the length D corresponding to the coupled length of the meter assembly 50, the spacer 62 and the spacer member 60 must be removed.

Considering now the meter assemblies 40 and 50 in greater detail, only meter assembly 50 will be described hereinafter in greater detail. Meter assembly 40 is substantially similar to the meter assembly 50. However, as shown in FIGS. 3 and 4, the meter assembly 40 is adapted to be coupled to the water supply system 20 by the female end of elbow 21 while the meter assembly 50 is adapted to be coupled to the water supply system 20 by male coupler 29.

Figure 6:
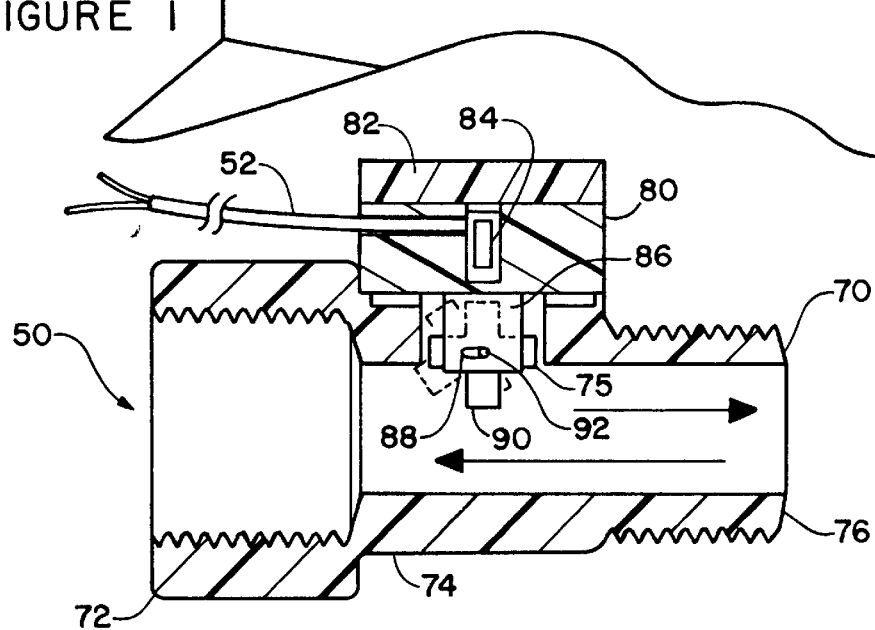
FIG. 6 is a cross-sectional view of a meter assembly for the flow meter apparatus of FIG. 5 illustrating the flow direction dependency thereof.

As shown in FIG. 6, the meter assembly 50 includes an elongated housing 70 defining a bore therethrough to facilitate the flow of water, and having a threaded female end 72, a central body portion 74 and a threaded male end 76. The threaded female end (not shown) and the threaded male end (not shown) of the meter assembly 40 are disposed in a reverse manner from the corresponding ends 72 and 76 of the assembly 50 to facilitate the coupling of the meter assembly 40 to the elbow 21.

A sensor housing 80 is coupled to the housing 70 and is in communication with the interior of the housing 70 via an opening 75. The sensor housing 80 includes a top member 82 and encloses a switch 84 therein. The switch 84 cooperates with a paddle wheel 90 disposed partially in the bore for generating an information signal indicative of the flow of water through the housing 70, and which signal is conducted by the conductor 52.

In this regard, a magnet (not shown) in the paddle wheel 90 cooperates with the switch 84 to generate electrical pulses defining the information signal and indicative of the water flow rate. The operation of the paddle wheel 90 in cooperation with the switch 84 is more fully described in copending U.S. patent application Ser. No. 08/560,161, which is incorporated by reference as if fully set forth herein.

A pair of support walls, including support wall 86, extend from the housing 80 down into the housing bore via the opening 75 to enable the paddle wheel 90 coupled rotatably between the support walls to rotate about an axle 92 as water flows through the bore of the housing 70.

Generally, water flows from the water supply system 20 through the meter assembly 50 and out of the faucet fixture 54, as indicated by the rightwardly directed arrow (FIG. 6). However, on occasion, the flow of water may be reversed, as indicated by the leftwardly directed arrow (FIG. 6). For example, low pressure in another portion of the water supply system 20 could cause water retained in the faucet fixture 54 to flow back into the conduit 24.

To limit the activation of the switch 84 when water flows back into the system 20, each of the support walls, such as support wall 86, includes an offset elongated opening 88 to slidably receive the axle 92 therein. The opening 88 enables the axle 92 and the paddle wheel 90 to be substantially centered within the opening 75 when the water flows in the rightward direction, and to enable the axle 82 and the paddle wheel 90 to be urged leftwardly when the water flows leftwardly. The centered paddle wheel 90 is shown in solid lines in FIG. 6 as a result of rightward water flow. The offset paddle wheel 90 is shown in dashed lines in FIG. 6 as a result of leftward water flow.

The flow of water in the leftward direction simultaneously rotates the paddle wheel 90 in a clockwise direction about the axle 92, and also urges the axle 92 leftwardly within the slot 88. As a result, the rotating paddle 90 engages the housing 70 as shown in dashed lines in FIG. 6, and the paddle 90 is prevented from rotating further. Thus, the paddle 90 cannot cooperate with the switch 84 to produce the electrical pulses.

Water flowing in the rightward direction urges the axle 92 and paddle 90 to the right until the paddle 90 is centered within the opening 75. In this position, the paddle 90 is free to rotate, and cooperate with the switch 84, to generate the electrical pulses as water flows out of the faucet 54.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for installing a flow meter system onto a utility distribution system disposed in a space behind a wall and having a conduit extending through a conduit opening in the wall for coupling a fixture to the utility distribution system, the flow meter system including a meter assembly and a transmitter device, the method comprising:
   connecting the meter assembly in fluid communication with the conduit, wherein the meter assembly is positioned outside of the space and substantially in front of the wall;
   installing the transmitter device within the space and positioned remotely from the meter assembly;
   connecting electrically the transmitter device to the meter assembly; and
   coupling the fixture in fluid communication with the meter assembly, wherein the meter assembly and the conduit opening are substantially concealed by the fixture.

2. A method according to claim 1, further including:
   making an access opening through the wall to enable the transmitter device to be disposed within the space; and
   positioning a cover over said access opening to conceal the transmitter device and said access opening.

3. A method according to claim 2, further including adjusting the axial length of the conduit extending outwardly from the wall by an amount corresponding to about the axial length of the meter assembly.

4. A method according to claim 3, further including:
   using a given length of an electrical conductor connected to the meter assembly to connect electrically the transmitter device to the meter assembly; and
   drawing said electrical conductor through the conduit opening into the space from said access opening to facilitate the connection of said electrical conductor with the transmitter assembly.

5. A method according to claim 4, further including disposing a spacer means between the meter assembly and the fixture, and in fluid communication therewith, to facilitate the coupling of the fixture to the meter assembly.

6. A method according to claim 5, further including:
   using a housing assembly to enclose the transmitter device within the space; and
   said installing of the transmitter device includes disposing said housing assembly containing the transmitter device within the space, wherein said cover also conceals said housing assembly.

7. A method according to claim 1, wherein the utility distribution system further includes another conduit extending through another conduit opening in the wall for coupling another fixture to the utility distribution system, and the flow meter system further includes another meter assembly, the method further including:
   connecting the second mentioned meter assembly in fluid communication with the second mentioned conduit, wherein the second mentioned meter assembly is positioned outside of the space and substantially in front of the wall, wherein the transmitter device is located remotely from the second mentioned meter assembly;
   connecting electrically the transmitter device to the second mentioned meter assembly; and
   coupling the second mentioned fixture in fluid communication with the second mentioned meter assembly, wherein the second mentioned meter assembly and the second mentioned conduit opening are substantially concealed by the second mentioned fixture.

8. A flow meter apparatus for installation on a utility resource distribution system having a supply conduit extending through a conduit opening in a wall, comprising:
   a fixture means having a housing defining a hollow interior for controlling the distribution of the utility resource, said housing including an internal coupler disposed within said hollow interior to facilitate the coupling of said fixture means to the supply conduit;
   a meter means connected in fluid communication with said fixture means for measuring the quantity of the utility resource being supplied to said fixture means, said meter means being adapted to be disposed substantially within said hollow interior to enable said fixture means to conceal said meter means when said fixture means is installed on the distribution system.

9. A flow meter apparatus according to claim 8, wherein said meter means transmits information indicative of the quantity of the utility resource being supplied when the utility resource flows in one direction, and wherein said information is substantially not transmitted by said meter means when the utility resource flows in another direction.

10. A flow meter apparatus according to claim 9, further including a spacer means coupled between said meter means and said internal coupler, and in fluid communication therewith, for positioning said meter means within said hollow interior to facilitate the connection of said fixture means to the supply conduit.

11. A flow meter apparatus according to claim 9, wherein said meter means includes a meter housing defining a bore to facilitate the flow of the utility resource therethrough, and a sensing means disposed partially in said bore for detecting the flow of the utility resource in said one direction.

12. A flow meter apparatus according to claim 11, wherein the meter housing further includes a transverse sensor opening in fluid communication with said bore, said sensing means includes a paddle wheel having a plurality of arms extending radially outwardly from a hub having an axle therethrough, said meter means further including a pair of spaced apart support walls extending through said sensor opening, each of said walls having a corresponding offset elongated opening therein for supporting rotatively said axle therebetween, wherein said paddle wheel is substantially centered in said sensor opening when the utility resource flows in said one direction to permit said paddle wheel to rotate freely, and wherein said paddle wheel is substantially offset in said sensor opening when the utility resource flows in said another direction for enabling said meter housing to obstruct the rotation of said paddle wheel.

13. A method of making a flow meter apparatus for installation on a utility resource distribution system having a supply conduit extending through a conduit opening in a wall, comprising:

using a fixture means having a housing defining a hollow interior for controlling the distribution of the utility resource, said housing including an internal coupler disposed within said hollow interior;

coupling a meter means in fluid communication with said housing means via said internal coupler for measuring the quantity of the utility resource being supplied to said fixture means; and disposing said meter means substantially within said hollow interior to enable said housing to conceal said meter means when said fixture means is installed on the distribution system.

14. A method according to claim 13, further including coupling a spacer means between said meter means and said internal coupler and in fluid communication therewith to permit said meter means to be received within said hollow interior.

15. A method according to claim 13, further including adapting said meter means to be a one way meter means.

* * * * *